United States Patent [19]

Shinozuka et al.

[11] Patent Number: 5,141,559
[45] Date of Patent: Aug. 25, 1992

[54] INK COMPOSITION

[75] Inventors: Masakazu Shinozuka; Masamitsu Uehara; Makoto Matsuzaki; Kenichi Kanbayashi, Suwa, all of Japan

[73] Assignee: Seiko Epson Corporation, Tokyo, Japan

[21] Appl. No.: 487,578

[22] Filed: Mar. 2, 1990

[30] Foreign Application Priority Data

Mar. 2, 1989 [JP] Japan .................................. 1-50884

[51] Int. Cl.⁵ ..................... C09D 11/06; C09D 11/12
[52] U.S. Cl. ....................................... 106/27; 106/20; 106/22; 106/31
[58] Field of Search ..................... 106/21, 22, 27, 14.5, 106/26, 493, 14.18, 20, 31; 534/803; 523/400; 428/484

[56] References Cited

U.S. PATENT DOCUMENTS

| | | | |
|---|---|---|---|
| 4,301,049 | 11/1981 | Funatsu et al. | 106/27 |
| 4,390,369 | 6/1983 | Merritt et al. | 106/31 |
| 4,484,948 | 11/1984 | Merritt et al. | 106/31 |
| 4,605,442 | 8/1986 | Kawashita et al. | 106/22 |
| 4,659,383 | 4/1987 | Lin et al. | 106/27 |

Primary Examiner—Mark L. Bell
Assistant Examiner—Helene Klemanski
Attorney, Agent, or Firm—Blum Kaplan

[57] ABSTRACT

An ink composition particularly well suited for use in an ink jet printer wherein the ink is jetted at temperatures higher than room temperature. The ink composition includes a metallic complex solvent dye coloring material dispersed in a vehicle of at least one high molecular weight alkyl amine, at least one high molecular weight fatty acid and carnauba wax.

25 Claims, No Drawings

INK COMPOSITION

BACKGROUND OF THE INVENTION

This invention relates to an ink composition which is solid or semi-solid at room temperature, and more particularly to an ink composition including a metallic complex-type solvent dye which can be used in an ink jet recording device wherein the ink is maintained at temperatures above room temperature for extended periods of time.

Ink jet recording is superior to other recording methods because it is quiet and can print at high speed. Conventional ink compositions for ink jet recording include water based compositions. Recording is accomplished by allowing the ink to permeate into the recording paper. Unfortunately, with water based compositions, the ink drop tends to blot as it permeates fully into the paper. This is particularly true when lesser quality, absorbent paper is used. In this case, the edges of a recorded dot of ink are unclear and printing quality deteriorates.

Ink jet recording methods for eliminating defects in water based inks are disclosed in U.S. Pat. Nos. 4,390,369, 4,484,948 and 4,659,383 and Japanese Patent Application Laid-Open No. 108271/83. In these methods, a wax based hot-melt ink composition, which is solid at room temperature, is heated so that it melts and the melted ink is propelled onto the recording paper. The ink solidifies on the surface of the paper as it cools to form a recorded dot. These ink compositions have poor resistance to heat, especially when exposed to elevated temperatures over long time periods.

It is possible to improve the heat resistance of the wax based ink by addition of an antioxidant. However, solvent complex dyes, particularly metallic complex solvent dyes which have especially good heat resistance, dissolve poorly in solid waxes and can not be used. Therefore, a solvent dye having good solubility in relatively polar waxes, and having poor heat resistance is used, for example, C.I. SOLVENT BLACK 3,7. Thus, the solvent dyes used in hot-melt ink compositions tend to decompose and turn brown when subjected to high temperatures over long time periods.

Accordingly, it is desirable to develop an improved ink composition for ink jet recording which avoids these shortcomings of the prior art.

SUMMARY OF THE INVENTION

Generally speaking, in accordance with the invention, an ink composition for use in an ink jet printer including a metallic complex solvent dye in a vehicle including at least one high molecular weight alkyl amine, at least one high molecular weight fatty acid and carnauba wax is provided. The vehicle is a solid or semi-solid material having a melting point or pour point above room temperature. The ink composition includes between about 0.1 and 10 weight percent of the metallic complex solvent dye, 0.1 and 10 weight percent of at least one high molecular weight alkyl amine, 0.1 and 30 weight percent of at least one high molecular weight fatty acid and 1 and 30 weight percent carnauba wax, based on the total weight of the composition. The ink composition ca be used in an ink jet printer wherein the ink composition is maintained at a temperature above room temperature.

Accordingly, it is an object of the invention to provide an improved ink composition.

A further object of the invention is to provide an improved ink composition which does not discolor when maintained at high temperature over a long time period.

It is another object of the invention to provide an improved ink composition including at least one metallic complex solvent dye having improved heat resistance.

Still another object of the invention is to provide an ink composition which is solid or semi-solid and can be used in an ink jet printer at a temperature higher than room temperature.

Still a further object of the invention is to provide an improved ink jet ink composition including at least one high molecular weight alkyl amine, at least one high molecular weight alkyl fatty acid and carnauba wax.

Yet another object of the invention is to provide a method of preparing an improved ink jet printing ink composition.

Still other objects and advantages of the invention will in part be obvious and will in part be apparent from the specification.

The invention accordingly comprises the several steps and the relation of one or more of such steps with respect to each of the others and the composition possessing the characteristics, properties, and the relation of components which will be exemplified in the composition hereinafter described, and the scope of the invention will be indicated in the claims.

DETAILED DESCRIPTION OF THE INVENTION

An ink composition for use in an ink jet printer which is solid or semi-solid at room temperature includes a vehicle (carrier) for transporting a coloring material. The coloring material is a metallic complex-type solvent dye. The vehicle includes at least one high molecular weight alkyl amine, at least one high molecular weight fatty acid and carnauba wax which has a melting point or pour point above room temperature. The ink composition includes between about 0.1 and 10 weight percent of the metallic complex solvent dye, between about 0.1 and 10 weight percent of at least one high molecular weight alkyl amine, between about 0.1 and 30 weight percent of a high molecular weight fatty acid and between about 1 and 30 weight percent carnauba wax based on the total weight of the composition. The ink composition may also include additional materials such as paraffins, paraffin waxes, micro-crystalline waxes, synthetic waxes and antioxidants.

Generally, the metallic complex solvent dyes used in the ink composition are soluble in polar solvents such as low molecular weight aliphatic alcohols, but have relatively poor solubility in low polarity waxes. However, metallic complex dyes dissolve in a mixture of at least one high molecular weight alkyl amine and at least one high molecular weight fatty acid. Moreover, the metallic complex solvent dye dissolved in the high molecular weight alkyl amine and high molecular weight fatty acid has good solubility in non-polar carnauba wax.

The metallic complex solvent dyes used in the ink composition are generally metal complexes of compounds containing azo groups (—N=N—) which are linked to $sp^2$ hybridized carbon atoms. The metallic complex solvent dye should be present between about 3 and 10 weight present, based on the total weight of the ink composition. The metallic complex solvent dyes include C.I. Acid Black 123 (Vali Fast Black 3804):

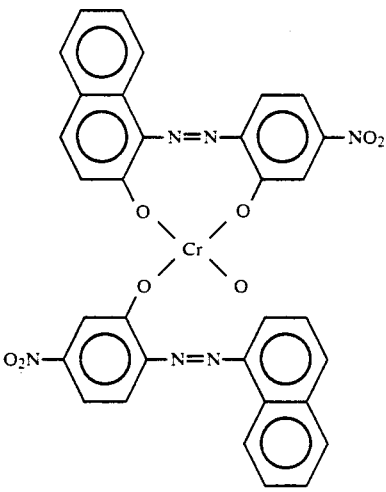

C.I. Acid Blue 158 (BASF-Palatine Fast Blue GGN):

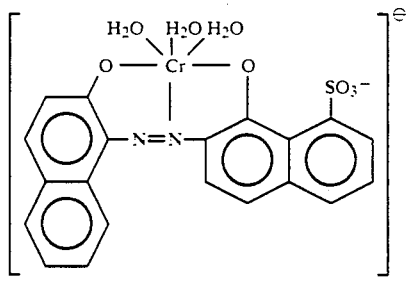

C.I. Acid Red 166 (BASF-Palatine Fast Pink BN):

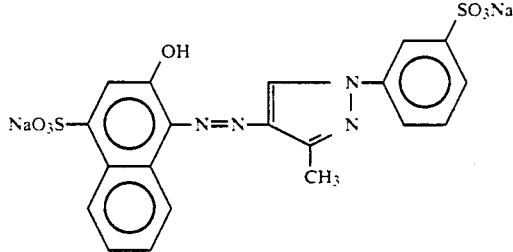

C.I. Acid Green 12 (BASF-Palatine Fast Green BLN)

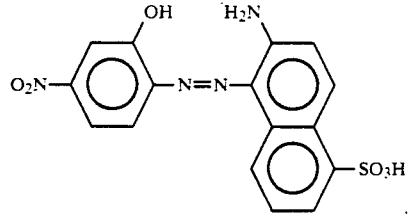

C.I. Acid Red 38 (Perlon Fast Red BS), C.I. Acid Violet 78 (Geigy-Irgalan Brown Violet DL), C.I. Acid Black 52 (Nylon Black GL), Palatine Fast Violet SRN (BASF), and C.I. Acid Yellow 99 (BASF-Palatine Fast Yellow GRN).

The ink compositions in accordance with the invention are prepared by mixing a metallic complex solvent dye with at least one high molecular weight alkyl amine and at least one high molecular weight fatty acid and the mixture is stirred at a temperature of at least 80° C. to dissolve the dye. Carnauba wax is then added to the mixture and stirred. Any additional materials are added and the mixture is stirred at a temperature of at least 80° C. to form a uniformly dissolved mixture. If necessary, the mixture is filtered at high temperature under fusing conditions.

The viscosity of the ink composition at a temperature or between about 100° C. and 200° C. is less than about 15.0 mPa.s which allows for proper droplet formation and jetting stability. Preferably, the viscosity is between about 7.0 about 2.0 mPa.s in order to obtain a high speed printing response of 2 to 3 kHz or higher.

The following components are those which are desirable for use in the ink compositions prepared in accordance with the invention:

1. High Molecular Weight Amines

The high molecular weight amine is preferably a wax having at least 14 carbon atoms. Acceptable high molecular weight amines include: Stearyl amine, distearyl amine, tristearyl amine, cetyl amine, dicetyl amine, tricetyl amine, N-ethyl-cetyl amine, myristyl amine, dimyristyl amine, and the like;

2. High Molecular Weight Fatty Acids

The high molecular weight fatty acid is preferably a fatty acid having at least about 15 carbon atoms. Acceptable high molecular weight fatty acids include: Lauric acid, palmitic acid, stearic acid, behenic acid, brassidic acid, and the like;

3. Carnauba Wax

Carnauba wax No. 1     (Noda Wax Co.)

4. Metallic Complex Solvent Dyes

Aizen Spilon Black BH, Aizen Spilon Black GSH special, Aizen Spilon

Black BLH special     (Hodogaya Chemical Co. Ltd.)

Vali Fast Black 3804     (Orient Kagaku Co. Ltd.)

5. Additional Materials a. Paraffins n-Paraffins and isoparaffins having between 23-32 carbon atoms.

b. Paraffin Waxes

Nos. 115, 120, 125, 130, 135, 140, 150, 155
NHP-3, 9, 10, 11
SP-0145, 1035, 3040, 3035, 0110 (Nippon Seiroh Co. Ltd.)

c. Micro-crystalline Wax

Hi-Mic-2095,1080,1045     (Nippon Seiroh Co. Ltd.)

d. Synthetic Waxes

Stearon, decanediol, monostearine, dodecanediol.

e. Other Materials

Antioxidants for limiting the oxidation of the ink composition.

An acceptable ink composition can be prepared with the following composition: between about 5 and 10 weight percent C.I. Acid Black 123 (Vali Fast Black 3804); between about 3 and 7 weight percent cetyl amine; between about 5 and 15 weight percent carnauba wax; and between about 45 and 72 weight percent paraffin wax.

The following examples are set forth to describe ink compositions prepared in accordance with the invention more clearly. They are set forth for purposes of illustration only and are not intended in a limiting sense.

EXAMPLE 1

|  | Composition | Weight % |
|---|---|---|
| Coloring Material: | Vali Fast Black 3804 | 7.0 |
| Vehicle: | Cetyl amine | 5.0 |
|  | Stearic acid | 10.0 |
|  | Carnauba Wax No. 1 | 20.0 |
|  | Paraffin Wax HNP 3 | 57.0 |
| Additional Materials: | Antioxidant; dimyristyl thio dipropyonate | 1.0 |

Cetyl amine and stearic acid were mixed ad Vali Fast Black 3804 was added to the mixture. The mixture was stirred at 100° C. Carnauba Wax No. 1 was added and the mixture was stirred at 100° C. Paraffin Wax HNP 3 and antioxidant were added and stirred at 100° C. The mixture was filtered under pressure using a teflon membrane filter with 5 μm pores to yield an ink composition having a viscosity of 5.5 mPa.s at a temperature of 120° C.

A conventional "ink on demand" type of ink jet head which can use hot melt ink was used to print dots with the ink described above. The ink jet was filled with this ink and bit image printing and character printing were performed on generally high quality paper, bond paper and PPC paper.

The various ink compositions were evaluated for ability not to fade after being maintained at high temperatures using the following tests:

Heat Fading Test I

Ink was poured into a Pyrex glass vessel, maintained at 180° C. for 1000 hours, and printing was performed on PPC paper. The ink compositions were evaluated based on the ink concentration as follows:

| OD value lowered less than 10% | ideal | (⊙) |
| OD value lowered 10-20% | suitable | (○) |
| OD value lowered 20% or more | not suitable | (X) |

The OD value of the ink composition of this Example I before the test was 1.35 and the OD value after the test was 1.25. Thus, the OD value was lowered less than 10% which is considered an ideal result.

Heat Fading Test II

Ink was poured into a Pyrex glass vessel, and the temperature was maintained at 200° C. for 24 hours and then at room temperature for 24 hours. This process was repeated twenty times. The ink was then printed onto PPC paper. The ink compositions were evaluated based on the ink concentration as follows:

| OD value lowered less than 10% | ideal | (⊙) |
| OD value lowered 10-20% | suitable | (○) |
| OD value lowered 20% or more | not suitable | (X) |

The OD value of the ink composition of this Example I before Heat Fading Test II was 1.35 and the OD value after the test was 1.22. Thus, the OD value was lowered less than 10% which is considered an ideal result.

The ink compositions in accordance with the invention shown as Examples 2-9 were prepared in the same manner as in Example 1. The specific components of each ink composition are shown in Table 1.

TABLE 1

| Vehicles, Additives, Color materials, Physical-properties, Others | Examples | | | | | | | | Comparative Examples | | |
|---|---|---|---|---|---|---|---|---|---|---|---|
|  | 2 | 3 | 4 | 5 | 6 | 7 | 8 | 9 | 1 | 2 | 3 |
| Kinds of higher alkyl amines | wt % | | | | | | | | | | |
| Stearyl amine | 0.3 | — | — | — | — | — | — | 10.0 | — | — | — |
| Distearyl amine | — | 2.0 | — | — | — | — | — | — | — | — | — |
| Tristearyl amine | — | — | 4.0 | — | — | — | — | — | — | — | — |
| Dicetyl amine | — | — | — | 6.0 | — | — | — | — | — | — | — |
| N-ethyl-cetyl amine | — | — | — | — | 7.0 | — | — | — | — | — | — |
| Myristyl amine | — | — | — | — | — | 8.0 | — | — | — | — | — |
| Dimyristyl amine | — | — | — | — | — | — | 10.0 | — | — | — | — |
| Fatty acid | | | | | | | | | | | |
| Lauric acid | 25.0 | — | — | — | — | — | — | 30.0 | — | — | — |
| Palmitic acid | — | 30.0 | — | — | — | — | — | — | — | — | — |
| Stearic acid | — | — | 20.0 | — | — | — | — | — | — | 20.0 | — |
| Behenic acid | — | — | — | 15.0 | — | 5.0 | — | — | 15.0 | — | — |
| Brassidic acid | — | — | — | — | 5.0 | — | 0.3 | — | — | — | — |
| Carnauba wax No. 1 | 1.0 | 3.0 | 5.0 | 10.0 | 15.0 | 20.0 | 30.0 | 30.0 | 15.0 | 20.0 | 30.0 |
| Metallic solvent complex dyes | | | | | | | | | | | |
| Aizen Spilon Black BH | 3.0 | 5.0 | 10.0 | — | — | — | — | 10.0 | — | — | — |
| Aizen Spilon Black GSH special | — | — | — | 5.0 | 8.0 | — | — | — | — | — | — |
| Aizen Spilon Black RLH special | — | — | — | — | — | 6.0 | — | — | 5.0 | — | — |
| Vali Fast Black 3804 | — | — | — | — | — | — | 10.0 | — | — | — | — |
| Paraffin waxes | | | | | | | | | | | |
| HNP-9 | 30.0 | — | — | — | — | — | — | — | — | — | 40.0 |
| HNP-10 | — | 30.0 | — | — | — | — | — | — | — | — | — |
| HNP-11 | — | — | 40.0 | — | — | — | — | — | — | — | — |
| HNP-0145 | — | — | — | — | 40.0 | — | — | — | — | — | — |
| SP-1035 | — | — | — | 50.0 | — | — | — | — | 50.0 | — | — |
| SP-3040 | — | — | — | — | — | 50.0 | — | — | — | — | — |
| SP-3035 | — | — | — | — | — | — | 40.0 | — | — | — | — |
| SP-0110 | — | — | — | — | — | — | — | — | — | 40.0 | — |
| Micro crystalline waxes | | | | | | | | | | | |
| Hi-Mic-2095 | 29.7 | — | — | 13.0 | — | — | — | 14.0 | — | — | — |

TABLE 1-continued

| Vehicles. Additives. Color materials. Physical-properties. Others | Examples | | | | | | | | Comparative Examples | | |
| --- | --- | --- | --- | --- | --- | --- | --- | --- | --- | --- | --- |
| | 2 | 3 | 4 | 5 | 6 | 7 | 8 | 9 | 1 | 2 | 3 |
| Hi-Mic-1080 | — | 10.0 | — | — | 4.0 | — | — | — | — | 19.0 | — |
| Hi-Mic-1045 | — | — | 10.0 | — | — | — | 4.0 | — | — | — | 10.0 |
| Antioxidant Dimyrestyl thio dipropyonate | 1.0 | 1.0 | 1.0 | 1.0 | 1.0 | 1.0 | 1.0 | 1.0 | 1.0 | 1.0 | 1.0 |
| Others | | | | | | | | | | | |
| Stearon | 10.0 | — | — | — | — | 7.0 | — | 19.0 | — | — | 14.0 |
| Decanediol | — | — | — | — | 20.0 | — | 4.7 | — | — | — | — |
| Monostearin | — | — | 10.0 | — | — | — | — | — | — | — | — |
| Dodecane diol | — | 19.0 | — | — | — | — | — | — | — | — | — |
| Usual solvent dyes | | | | | | | | | | | |
| C.I. Solvent Black 7 | — | — | — | — | — | — | — | — | — | 5.0 | — |
| C.I. Solvent Black 3 | — | — | — | — | — | — | — | — | — | — | 5.0 |
| Viscosity (mPa.s/120° C.) | 6.0 | 6.5 | 5.7 | 4.0 | 5.0 | 6.2 | 7.0 | 9.3 | 4.8 | 6.8 | 7.0 |

Heat Fading Tests I and II were performed on the ink compositions of Examples 2–9 in the same manner as in Example 1. The results are shown in Table 2.

TABLE 2

| | Heat-fading test I | Heat-fading test II |
| --- | --- | --- |
| (Examples) | | |
| 1 | ⊙ | ⊙ |
| 2 | ⊙ | ⊙ |
| 3 | ⊙ | ○ |
| 4 | ⊙ | ⊙ |
| 5 | ⊙ | ⊙ |
| 6 | ○ | ○ |
| 7 | ⊙ | ⊙ |
| 8 | ○ | ⊙ |
| 9 | ⊙ | ⊙ |
| (Comparative Examples) | | |
| 1 | — | — |
| 2 | X | X |
| 3 | X | X |

COMPARATIVE EXAMPLES 1–3

The ink compositions shown as Comparative Examples 1–3 in Table 1 were prepared in the same manner as in Example 1.

Comparative Examples 1–3 were evaluated with Heat Fading Tests I and II as in Example 1. The results are shown in Table 2 and described below in further detail.

COMPARATIVE EXAMPLE 1

The metallic complex solvent dye exhibited poor solubility. The OD value of the ink composition was 0.3 after preparation and filtration (prior to Heat Tests I and II).

COMPARATIVE EXAMPLE 2

The OD value was lowered 40% in each test. Thus, the ink was characterized as not suitable.

COMPARATIVE EXAMPLE 3

The solvent dye exhibited poor heat resistance, and the ink turned brown in both tests.

In summary, the ink compositions prepared in accordance with the invention utilize heat resistant metallic complex solvent dyes in a vehicle including a high molecular weight alkyl amine, a high molecular weight fatty acid and carnauba wax and provide high quality print even when used in ink jet recording devices which maintain the ink at temperatures above room temperature for extended periods of time. Even in these high temperature environments, the ink compositions resist fading and discoloration over long time periods.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An ink composition for ink jet recording on a recording medium at temperatures higher than room temperature, comprising:
    a vehicle including a mixture of at least one high molecular weight alkyl amine, at least one high molecular weight fatty acid and carnauba wax; and
    an effective amount of a metallic complex solvent dye dissolved in the vehicle to provide sufficient optical density for recording;
    the alkyl amine and fatty acid are present in effective amounts to allow the dye to dissolve in the carnauba wax and provide a stable ink composition that is one of solid or semi-solid at room temperature and having a melting or pour point above room temperature.

2. The ink composition of claim 1, wherein the fatty acid is stearic acid.

3. The ink composition of claim wherein the high molecular weight alkyl amine is a wax having at least 14 carbon atoms.

4. The ink composition of claim 1, wherein the high molecular weight amine is present between about 0.1 and 10 weight percent, based on the total weight of the composition.

5. The ink composition of claim 1, wherein the high molecular weight fatty acid is a fatty acid having at least about 15 carbon atoms.

6. The ink composition of claim 1, wherein the high molecular weight fatty acid is present between about 0.1 and 30 weight percent, based on the total weight of the composition.

7. The ink composition of claim 1, wherein the carnauba wax is present between about 1 and 30 weight percent, based on the total weight of the composition.

8. The ink composition of claim 1, wherein the metallic complex solvent dye is present between about 0.1 and 10 weight percent, based on the total weight of the composition.

9. The ink composition of claim 1, wherein the metallic complex solvent dye is present between about 3 and 10 weight percent, based on the total weight of the composition.

10. The ink composition of claim 4, wherein the high molecular weight amine is selected from the group consisting of stearyl amine, distearyl amine, tristearyl amine, dicetyl amine, N-ethyl-cetyl amine, myristyl amine and dimyristyl amine.

11. The ink composition of claim 8, wherein the amine is cetyl amine.

12. The ink composition of claim 5, wherein the high molecular weight fatty acid is selected from the group consisting of lauric acid, palmitic acid, stearic acid, behenic acid and brassidic acid.

13. The ink composition of claim 8, wherein the fatty acid is stearic acid.

14. The ink composition of claim 1, further including an effective amount of an antioxidant to substantially limit oxidation of the ink composition.

15. A method for preparing an ink composition for ink jet recording on a recording medium, comprising:
    mixing an effective amount of a metallic complex solvent dye to provide sufficient optical density with at least one high molecular weight alkyl amine and at least one high molecular weight fatty acid to form a first mixture;
    stirring the first mixture at a temperature of at least 80° C. to dissolve the dye;
    mixing an effective amount of carnauba wax with the first mixture to form a second mixture, the amount of dye, amine and fatty acid selected to be effective to dissolve the dye and provide a stable ink composition that is one of solid or semi-solid at room temperature and to have a melting or pour point above room temperature; and
    stirring the second mixture to form a uniformly dissolved mixture.

16. The method of claim 15, wherein the high molecular weight amine is present between about 0.1 and 10 weight percent.

17. The method of claim 15, wherein the high molecular weight fatty acid is present between about 0.1 and 30 weight percent.

18. The method of claim 15, wherein the carnauba wax is present between about 1 and 30 weight percent.

19. The method of claim 15, wherein the dye is present between about 0.1 and 10 weight percent.

20. An ink jet composition for ink jet recording on a recording medium, comprising:
    between about 5 and 10 weight percent of C.I. Acid Black 123;
    between about 3 and 7 weight percent of cetyl amine;
    between about 5 and 15 weight percent of carnauba wax; and
    between about 45 and 72 weight percent of paraffin wax.

21. The ink composition of claim 20, wherein the ink composition includes 7 weight percent of C.I. Acid Black 123, 5 weight percent of cetyl amine, 10 weight percent of stearic acid, 20 weight percent of carnauba wax and 57 weight percent of paraffin wax.

22. The ink composition of claim 21, further including an effective amount of at least one antioxidant for stabilizing the ink composition.

23. An ink composition for ink jet recording on a recording medium at temperatures higher than room temperature, comprising:
    a vehicle including a mixture of at least one high molecular weight fatty acid and carnauba wax; and
    an effective amount of a metallic complex solvent dye to provide sufficient optical density for recording dissolved in the vehicle;
    the and fatty acid being present in an effective amount to provide a stable ink composition that is one of solid or semi-solid at room temperature and having a melting or pour point above room temperature.

24. The ink composition of claim 23, wherein the dye is C.I. Acid Black 123.

25. The ink composition of claim 23, wherein the high molecular weight fatty acid is a fatty acid having at least about 15 carbon atoms.

* * * * *